United States Patent
Boysen et al.

(10) Patent No.: US 6,749,896 B2
(45) Date of Patent: Jun. 15, 2004

(54) SELF-CROSS LINKING POWDER PAINT BASED ON EPOXY RESINS AND THE USE THEREOF

(75) Inventors: Rolf Boysen, Münster (DE); Helmut Riestenpatt, Münster (DE); Christoph Hilger, Münster (DE); Carsten Vietze, Drensteinfurt (DE); Josef Rademacher, Münster (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 10/275,849

(22) PCT Filed: Jun. 12, 2001

(86) PCT No.: PCT/EP01/06615

§ 371 (c)(1),
(2), (4) Date: Dec. 16, 2002

(87) PCT Pub. No.: WO01/96486

PCT Pub. Date: Dec. 20, 2001

(65) Prior Publication Data

US 2003/0153668 A1 Aug. 14, 2003

(30) Foreign Application Priority Data

Jun. 15, 2000 (DE) .......................... 100 29 548

(51) Int. Cl.$^7$ ................................. B05D 3/12
(52) U.S. Cl. .................. 427/356; 428/419; 523/440; 523/443; 523/466; 525/523; 525/524
(58) Field of Search .................. 427/356; 428/410; 523/440, 443, 466; 525/523, 524

(56) References Cited

U.S. PATENT DOCUMENTS

| | | | |
|---|---|---|---|
| 4,039,548 A | 8/1977 | Malone | 260/29.2 |
| 4,849,283 A | 7/1989 | Porter, Jr. et al. | 428/323 |
| 5,055,524 A | 10/1991 | Pettit, Jr. et al. | 525/172 |
| 5,153,239 A | 10/1992 | Kitagawa et al. | 523/429 |

FOREIGN PATENT DOCUMENTS

| | | | | |
|---|---|---|---|---|
| CA | 2 064 290 | 3/1927 | | C09D/5/03 |
| CA | 2 064 292 | 3/1992 | | C09D/167/00 |
| EP | 322 827 | 12/1988 | | C09D/5/03 |
| EP | 509 392 | 4/1992 | | C09D/5/03 |
| EP | 509 393 | 4/1992 | | C09D/5/03 |
| EP | 517 536 | 6/1992 | | C09D/5/03 |
| JP | 5279452 | * 10/1993 | | |

OTHER PUBLICATIONS

Database WPI, Section Ch, Week 199347, Derwent Publication Ltd., London GB; AN 1993–374644, XP002177806.
BASF Corp. Publications Coatings Partner, the magazine of BASF, Powder Coatings Special, Jan. 2000.
BASF Coatings AG "Pulverlacke, Pulverlacke, für industrielle Anwendungen" [Powder coating materials, powder coatings for industrial applications], Jan. 2000.

* cited by examiner

*Primary Examiner*—Philip Tucker
*Assistant Examiner*—D. Aylward

(57) ABSTRACT

A self-crosslinking powder coating material, comprising
(A) up to 50% by weight, based on the powder coating material, of a mixture of
  (A1) at least one epoxy resin with an epoxy equivalent weight (EEW) <800 g,
  (A2) at least one epoxy resin with an epoxy equivalent weight (EEW) of from 800 to 1500 g, and
  (A3) at least one epoxy resin with an epoxy equivalent weight (EEW) >1500 g,
and
(B) at least 50% by weight, based on the powder coating material, of at least one filler;
and its use to coat shaped parts, especially engine blocks, which after coating are shaped by machining.

10 Claims, No Drawings

SELF-CROSS LINKING POWDER PAINT BASED ON EPOXY RESINS AND THE USE THEREOF

This application is a National Phase Application of Patent Application PCT/EP01/06615 filed on Jun. 12, 2001.

The present invention relates to a novel, self-crosslinking powder coating material based on epoxy resins and to its use to coat shaped parts.

Powder coating materials based on epoxy resin are known from European Patent Applications EP 0 509 392 A 1, EP 0 509 393 A 1, EP 0 322 827 A 1 or EP 0 517 536 A 1, from U.S. Pat. Nos. 5,055,524 or 4,849,283, or from the company publications Coatings Partner, The magazine of BASF, Powder Coatings Special, 1/2000, or BASF Coatings AG "Pulverlacke, Pulverlacke für industrielle Anwendungen" [Powder coating materials, powder coatings for industrial applications], January 2000. The systems in question are externally crosslinking systems, i.e., the epoxy resins are crosslinked using hardeners, such as phenolic or amine hardeners or bicyclic guanidines.

Externally crosslinking describes coating materials in which one type of complementary reactive functional groups is present in the binder and another kind is present in a hardener or crosslinking agent. The complementary reactive functional groups are able to react with one another and so construct a three-dimensional network. In contrast, the term "self-crosslinking" denotes the capacity of a binder to enter into crosslinking reactions with itself. A prerequisite for this is that both kinds of complementary reactive groups required for crosslinking are already present in the binders, or that there is one kind of reactive functional groups present that is able to react "with itself". For further details, reference is made to Römpp Lexikon Lacke und Druckfarben, Georg Thieme Verlag, Stuttgart, New York, 1998, "Curing", pages 274 to 276, especially page 275, bottom.

Shaped parts, especially engine blocks for motor vehicles of all kinds, are increasingly being coated, for reasons both of aesthetics and corrosion protection. Since powder coating materials are solvent-free, easy to apply, and easy to recover as overspray, and the corresponding powder coatings have good mechanical properties and firm adhesion to the substrate, and also offer very good corrosion protection, they are increasingly being used for this utility.

The engine block blanks are usually coated while still in the iron works and are subsequently machined by milling and/or drilling. The heat produced in the course of these operations softens the customary and known powder coatings, making it impossible to produce defined cuts and bores. Moreover, owing to the thermal/mechanical load, the powder coatings form greasy, gluelike polymer melts which cause sticking of the tools and are very difficult to remove. Increasing the density of crosslinking is generally no solution, since the associated embrittlement of the powder coatings can cause them to flake in the course of subsequent machining.

It is an object of the present invention to find a new self-crosslinking powder coating material from which the disadvantages of the prior art are absent and which instead can be prepared in a simple manner from readily available starting compounds and gives powder coatings which, while retaining all of the other advantageous performance properties, are cuttable, millable and drillable and, as a consequence, are highly suitable for the coating of shaped parts, especially engine blocks, which require subsequent machining.

Accordingly, we have found the novel self-crosslinking powder coating material which comprises (A) up to 50% by weight, based on the powder coating material, of a mixture of
(A1) at least one epoxy resin with an epoxy equivalent weight (EEW) <800 g,
(A2) at least one epoxy resin with an epoxy equivalent weight (EEW) of from 800 to 1500 g, and
(A3) at least one epoxy resin with an epoxy equivalent weight (EEW) >1500 g,
and
(B) at least 50% by weight, based on the powder coating material, of at least one filler
and which is referred to below as "powder coating material of the invention".

Further subjects of the invention will emerge from the description.

In the light of the prior art, it was surprising and unforeseeable by the skilled worker that the powder coating material of the invention would be able to solve the problem on which the present invention is based. On the contrary, the expectation was that the powder coatings of the invention, like the customary and known powder coatings based on epoxy resin, would not be cuttable, millable or drillable but instead, owing to the thermal/mechanical load in the course of machining, would likewise give greasy, gluelike polymer melts which are very difficult to remove.

The first constituent, essential to the invention, of the powder coating material of the invention is the mixture (A) of epoxy resins which has self-crosslinking properties.

The amount of the epoxy resin mixture (A) in the powder coating material of the invention, based on the powder coating material, is up to 50% by weight. It is preferably from 20 to 49, more preferably from 25 to 48, with particular preference from 30 to 47, with very particular preference from 35 to 46, and in particular from 40 to 45% by weight.

Suitable epoxy resins are, fundamentally, all epoxy resins which have the epoxide equivalent weights (EEW) described below and are self-crosslinking in combination with one another. Particularly advantageous epoxy resins are linear epoxy resins which are bifunctional in respect of the epoxide groups and are based on aromatic diphenols, preferably bisphenol A and F, especially bisphenol A. They are used with particular preference in accordance with the invention.

In accordance with the invention, the epoxy resin mixture (A) comprises at least one epoxy resin (A1) with an EEW of <800, preferably <750, more preferably <700, and in particular <650 g. The amount of (A1) in the mixture (A) may vary widely. Based on (A), it is preferably from 10 to 40, more preferably from 12 to 39, with particular preference from 14 to 38, with very particular preference from 18 to 37, and in particular from 20 to 36% by weight.

In accordance with the invention, the epoxy resin mixture (A) further comprises at least one epoxy resin (A2) with an EEW of from 800 to 1500, preferably from 800 to 1300, with particular preference from 800 to 1100, with very particular preference from 800 to 1000, and in particular from 800 to 900 g. The amount of (A2) in the mixture (A) may vary widely. Based on (A), it is preferably from 40 to 75, more preferably from 42 to 73, with particular preference from 44 to 70, with very. particular preference from 46 to 68, and in particular from 50 to 65% by weight.

In accordance with the invention, the epoxy resin mixture (A) further comprises at least one epoxy resin (A3) with an EEW of >1500, preferably from 800 to 1300, with particular preference from 800 to 1100, with very particular preference from 800 to 1000, and in particular from 800 to 900 g. The amount of (A3) in the mixture (A) may vary widely. Based on (A), it is preferably from 5 to 15, more preferably from 6 to 14, with particular preference from 7 to 13, with very particular preference from 8 to 12, and in particular from 8.5 to 11.5% by weight.

In the powder coating materials of the invention, the percentages by weight stated above for the epoxy resins (A1), (A2) and (A3) add up in each case to 100% by weight.

The epoxy resins (A1), (A2) and (A3) are compounds which are known per se and are marketed, for example, by the companies Dow Chemical, Shell Chemie, or Ciba Specialty Chemical.

As a further constituent essential to the invention, the powder coating material of the invention comprises at least one filler (B). Suitable fillers (B) are, in principle, all organic and inorganic, especially inorganic, fillers, as described, for example, in Römpp Lexikon Lacke und Druckfarben, Georg Thieme Verlag, Stuttgart, New York, 1998, "Fillers", pages 250 to 252, and which do not exhibit any melting and/or decomposition during the machining of the shaped parts.

The fillers (B) preferably have a density of from 0.8 to 3.6, more preferably from 0.9 to 3.4, with particular preference from 1.0 to 3.2, and in particular from 1.1 to 3.0 g cm$^{-3}$. Although it might also be possible in certain cases to use fillers (B) having a lower density, there would then be the risk that these fillers (B) or the powder coating particles comprising them would "float" in the coating materials on prolonged storage. On the other hand, it might also be possible in certain cases to use fillers (B) having a higher density, but there would then be the risk of the electrostatic properties undergoing adverse alteration at the time of powder spraying.

Examples of suitable fillers (B) are crosslinked or noncrosslinked, organic or organometallic polymers, inorganic minerals, salts or ceramic materials, or organically modified ceramic materials, or mixtures of these substances. Of these, the inorganic minerals are of advantage and are therefore used with preference. They may comprise natural and synthetic minerals.

Examples of the highly suitable minerals are silica, aluminum silicates, calcium silicates, magnesium silicates, calcium aluminum silicates, magnesium aluminum silicates, calcium magnesium silicates, calcium magnesium aluminum silicates, beryllium aluminum silicates, aluminum phosphate or calcium phosphate, or mixtures thereof. Of these, the silicates are particularly advantageous and are therefore used with particular preference in accordance with the invention as fillers (B).

The fillers (B) are present in the powder coating materials of the invention in an amount, based on the powder coating material, of at least 50% by weight. The powder coating material of the invention comprises preferably from 50.5 to 80, more preferably from 51 to 75, with particular preference from 51.5 to 70, with very particular preference from 52 to 65, and in particular from 52.5 to 60% by weight, based in each case on the powder coating material of the invention.

The powder coating material of the invention may comprise at least one accelerator (C) (regarding the term, cf. Römpp Lexikon Lacke und Druckfarben, Georg Thieme Verlag, Stuttgart, New York, 1998, "Accelerators", page 70). Suitable accelerators (C) are all compounds as commonly employed to activate crosslinking reactions of epoxy resins.

Examples of suitable accelerators (C) and their mode of action are described in the textbook by Johan Bieleman, "Lackadditive" [Coatings additives], Wiley-VCH, Weinheim, New York, 1998, pages 263 to 269.

Examples of highly suitable accelerators (C) are phosphonium salts of organic or inorganic acids, imidazole and imidazole derivatives, quaternary ammonium compounds, and amines.

Examples of suitable phosphonium salts (C) are ethyltriphenylphosphonium iodide, ethyltriphenylphosphonium chloride, ethyltriphenylphosphonium thiocyanate, ethyltriphenylphosphonium acetate-acetic acid complex, tetrabutylphosphonium iodide, tetrabutylphosphonium bromide, and tetrabutylphosphonium acetate-acetic acid complex. These and other suitable phosphonium salts (C) are described, for example, in U.S. Pat. Nos. 3,477,990 and 3,341,580.

Examples of suitable imidazoles (C) are 2-styrylimidazole, 1-benzyl-2-methylimidazole, 2-methylimidazole, and 2-butylimidazole. These and other imidazoles are described, for example, in Belgian Patent No. 756,693.

The accelerators (C) may be present in the powder coating material of the invention in an amount of preferably from 0.01 to 5, more preferably from 0.05 to 4.5, with particular preference from 0.1 to 4, with very particular preference from 0.3 to 3.5, and in particular from 0.5 to 3% by weight, based in each case on the powder coating material.

It is the particular advantage of the powder coating material of the invention that, owing to the accelerator (C), and despite the absence of the customary and known hardeners for epoxy resins (cf. Johan Bieleman, "Lackadditive", Wiley-VCH, Weinheim, New York, 1998, pages 263 to 269), the self-crosslinking of the epoxy resin mixture may be significantly accelerated.

The powder coating material of the invention may further comprise at least one color and/or effect pigment (D).

The pigments (D) may comprise organic or inorganic compounds. Therefore, owing to this large number of suitable pigments (D), the powder coating material ensures a universal breadth of use and makes it possible to realize a large number of color shades and optical effects.

Effect pigments (D) used may be metal flake pigments such as commercial aluminum bronzes, aluminum bronzes chromated in accordance with DE-A-36 36 183, commercial stainless steel bronzes, and nonmetallic effect pigments, such as, for example, pearlescent pigments and interference pigments. For further details, reference is made to Römpp Lexikon Lacke und Druckfarben, Georg Thieme Verlag, 1998, page 176, "Effect pigments" and pages 380 and 381, "Metal-oxide-mica pigments" to "Metal pigments".

Examples of suitable inorganic color pigments (D) are titanium dioxide, iron oxides, sicotrans yellow, and carbon black, especially carbon black. Examples of suitable organic color pigments are thioindigo pigments, indanthrene blue, Cromophthal red, Irgazine orange, and Heliogen green. For further details, reference is made to Römpp Lexikon Lacke und Druckfarben, Georg Thieme Verlag, 1998, pages 180 and 181, "Iron blue pigments" to "Black iron oxide", pages 451 to 453, "Pigments" to "Pigment volume concentration", page 563, "Thioindigo pigments", and page 567, "Titanium dioxide pigments".

The fraction of the pigments (D) in the powder coating material of the invention may vary extremely widely and is guided in particular by the hiding powder of the pigments, by the desired shade, and by the desired optical effect. The skilled worker will therefore be able to select the pigments (D) and their amount, as especially suitable for a given powder coating material of the invention, on the basis of his or her general technical knowledge, with or without the aid of simple preliminary experiments, in the course, for example, of tinting tests.

Furthermore, the powder coating material of the invention may comprise at least one customary and known additive (E) in customary and known, effective amounts.

Examples of suitable additives (E) are additional oligomeric and polymeric binders, UV absorbers, light stabilizers, free-radical scavengers, thermally labile free-radical initiators, devolatilizers, slip additives, polymerization inhibitors, defoamers, emulsifiers, wetting agents, dispersants, adhesion promoters, leveling agents, film-forming auxiliaries, flame retardants, corrosion inhibitors, flow aids, waxes, and flatting agents.

The powder coating materials of the invention are prepared in accordance with the customary and known methods, as described, for example, in the product information bulletin from BASF Lacke+Farben AG, "Pulverlacke" [Powder coating materials], 1990, or in the BASF Coatings AG company publication "Pulverlacke, Pulverlacke für industrielle Anwendungen", January 2000, by homogenizing and dispersing, by means for example of an extruder, screw compounder and the like. After the powder coating materials of the invention have been prepared, they are adjusted to the desired particle size distribution by grinding and, if appropriate, by classifying and sieving. An especially suitable particle size distribution is described, for example, in European Patent Application EP 0 666 779 A 1.

The application and curing of the powder coating materials of the invention do not require any special measures either, but instead are carried out as described in the above-mentioned company publications.

The thickness of the resultant powder coating of the invention may vary widely. Preferably it is from 20 to 100, more preferably from 22 to 90, with particular preference from 24 to 80, with very particular preference from 26 to 70, and in particular from 28 to 65 $\mu$m.

The powder coating of the invention may be used to coat shaped parts made of metal, glass, temperature-stable plastics, wood or synthetic and natural mineral materials, or composite materials thereof. It is therefore suitable for the coating of components in the interior and exterior sector, of furniture, doors, window frames, industrial components for home and professional use, including containers, packaging and coils, and of components for the production of transport equipment of whatever kind, including motor vehicles or boats. Principally, however, it is employed to coat shaped parts which following their coating are shaped by machining, for example by milling and/or drilling. Very particular advantages are displayed by the powder coating of the invention in connection with the coating of engine blocks, especially engine blocks for motor vehicles of whatever kind.

The powder coating of the invention has very good leveling, a high optical quality, a very high hiding power, excellent adhesion to the shaped parts coated with it, and also a very good corrosion protection effect and scratch resistance. Above all, however, it is not damaged when the shaped parts are machined and does not form greasy, gluelike polymer melts which cause sticking of the tools and are very difficult to remove. It is cuttable and may be milled and/or drilled together with the shaped part.

EXAMPLE

The Production of a Powder Coating of the Invention 13 parts by weight of the epoxy resin DER® 662 from Dow (EEW 600 g), 4.2 parts by weight of the epoxy resin Epikote® 1055 from Shell Chemie (EEW 800 to 900 g), 26 parts by weight of the epoxy resin Epikote® 1007 from Shell Chemie (EEW >1500 g), 1 part by weight of lamp black, 54 parts by weight of the commercial silicate filler Minex®, 1 part by weight of the accelerator 2-methylimidazole, and 0.8 part by weight of the commercial leveling agent BYK® 360 P from Byk Chemie were mixed with one another on an extruder. The resultant mixture was discharged, cooled, granulated, ground and classified, giving the powder coating material of the invention.

The powder coating material was applied to steel panels in a powder spraying unit and cured at 150° C. The resultant powder coating was 55 $\mu$m thick. It showed very good leveling, had a high optical quality, very high hiding power, excellent adhesion to the steel panels coated with it, and also a very good corrosion protection effect and scratch resistance.

The coated steel panels were milled, drilled, and cut. The powder coating here was found to be cuttable: there were no instances of flaking of the powder coating and no greasy, gluelike, very difficul-to-remove polymer melts were formed which might have caused sticking of the tools.

What is claimed is:

1. A self-crosslinking powder coating material, comprising
    (A) up to 50% by weight, based on the powder coating material, of an epoxy resin mixture comprising
        (A1) from 10 to 40% by weight of the epoxy resin mixture of at least one epoxy resin with an epoxy equivalent weight (EEW) of from <800 g,
        (A2) from 40 to 75% by weight of the epoxy resin mixture of at least one epoxy resin with an epoxy equivalent weight (EEW) of from 800 to 1500 g, and
        (A3) from 5 to 15% by weight of the epoxy resin mixture of at least one epoxy resin with an epoxy equivalent weight (EEW) >1500 g, and
    (B) at least 50% by weight, based on the powder coating material, of at least one filler.

2. The material of claim 1, wherein the epoxy resin mixture comprises from 12 to 39% by weight (A1), from 42 to 73% by weight (A2) and from 6 to 14% by weight (A3), with the proviso that the weight percentages of (A1), (A2), (A3) add up to 100% by weight.

3. The material of claim 1, further comprising at least one accelerator (C).

4. The material of claim 1, further comprising at least one color and/or effect pigment (D).

5. The material of claim 1, further comprising at least one additive (E).

6. The material of claim 1, wherein the density of the filler (B) is $\leq 3.6$ g/cm$^3$.

7. A method of coating shaped parts, comprising applying the material of claim 1 to a shaped part to provide a coated shaped part.

8. The method of claim 7, wherein the coated shaped parts are subsequently shaped by machining.

9. The method of claim 8, wherein said machining comprises drilling and/or milling.

10. The method of claim 7, wherein said shaped part comprises an engine block.

* * * * *